(12) United States Patent
Suddreth et al.

(10) Patent No.: US 10,810,886 B2
(45) Date of Patent: Oct. 20, 2020

(54) SYSTEMS AND METHODS FOR GENERATING AVIONIC DISPLAYS INCLUDING FORECAST BOOM TOLERANCE THRESHOLD EXCEEDANCE SYMBOLOGY

(71) Applicant: HONEYWELL INTERNATIONAL INC., Morris Plains, NJ (US)

(72) Inventors: John G. Suddreth, Cave Creek, AZ (US); Jerry Ball, Peoria, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 409 days.

(21) Appl. No.: 15/825,916

(22) Filed: Nov. 29, 2017

(65) Prior Publication Data
US 2019/0164436 A1 May 30, 2019

(51) Int. Cl.
*G01C 23/00* (2006.01)
*G08G 5/00* (2006.01)
(Continued)

(52) U.S. Cl.
CPC ........... *G08G 5/0021* (2013.01); *B64D 43/00* (2013.01); *B64D 45/00* (2013.01); *G01C 23/00* (2013.01);
(Continued)

(58) Field of Classification Search
CPC .. G08G 5/0021; G08G 5/0039; G08G 5/0017; G06F 30/15; G01C 23/00;
(Continued)

(56) References Cited

U.S. PATENT DOCUMENTS 3,442,115 A * 5/1969 Slutsky ................ G10K 15/043
73/12.08
3,737,119 A 6/1973 Cheng
(Continued)

OTHER PUBLICATIONS

Joslin et al.; Sonic Boom Awareness in the Civil Supersonic Cockpit; Flight Test Safety Workshop, Apr. 23-25, 2013.
(Continued)

*Primary Examiner* — Hung T Nguyen
(74) *Attorney, Agent, or Firm* — Lorenz & Kopf, LLP (57) ABSTRACT

Avionic display systems and methods are provided for generating avionic displays including symbology decreasing the likelihood of boom tolerance threshold exceedance (an overpressure events) due to potential constructive interference between pressure waves occurring during supersonic flight. In various embodiments, the avionic display system includes a display device on which an avionic display is generated. A controller architecture is operably coupled to the display device and configured to determine when there exists a possibility for an overpressure event to occur in a future timeframe due to constructive interference between colliding pressure waves, which are forecast to occur during the impending supersonic flight of one or more A/C. When determining that there exists a possibility for an overpressure event to occur in the future timeframe due to constructive interference between pressure waves, the controller architecture further generates symbology or other graphics on the avionic display indicative of the potential occurrence of the overpressure event.

20 Claims, 5 Drawing Sheets

(51) Int. Cl.
  *B64D 43/00*    (2006.01)
  *B64D 45/00*    (2006.01)
  *G06F 30/15*    (2020.01)
  *B64C 23/04*    (2006.01)
  *B64C 30/00*    (2006.01)
  *G06F 119/10*   (2020.01)

(52) U.S. Cl.
  CPC ............ *G06F 30/15* (2020.01); *G08G 5/0039* (2013.01); *B64C 23/04* (2013.01); *B64C 30/00* (2013.01); *G06F 2119/10* (2020.01)

(58) Field of Classification Search
  CPC .......... B64D 43/00; B64C 30/00; G01H 1/00; G01H 5/00; G01H 11/00
  USPC .................... 340/943, 945, 963, 964, 973
  See application file for complete search history.

(56) References Cited

U.S. PATENT DOCUMENTS

| | | |
|---|---|---|
| 6,905,091 B2 | 6/2005 | Berson et al. |
| 7,599,805 B2 | 10/2009 | Pilon |
| 8,145,366 B1 | 3/2012 | Haering, Jr. et al. |
| 9,376,983 B2 * | 6/2016 | Moeckly .................. F02D 45/00 |
| 2005/0098681 A1 | 5/2005 | Berson et al. |
| 2008/0228413 A1 | 9/2008 | Pilon |
| 2017/0132356 A1 | 5/2017 | Shen |

OTHER PUBLICATIONS

USPTO Office Action for U.S. Appl. No. 15/798,692 dated Jul. 9, 2018.
Carlson, H.W. et al.; Simplified Sonic-Boom Prediction; NASA Technical Paper 1122, 1978.
USPTO Notice of Allowance for U.S. Appl. No. 15/798,692 dated Oct. 11, 2018.
Smith-Velazquez Laura M et al: "Synthetic vision display with integral sonic boom predictions", Proceedings of SPIE; [Proceedings of SPIE ISSN 0277-786X vol. 10524], SPIE, US, vol. 10197, May 5, 2015 (May 5, 2017), pp. 1019708-1019708, XP060088524, DOI: 10.1117/12.2262356 ISBN: 978-1-5106-1533-5.
Gpo: "14 CFR Part 36—Noise Standards: Aircraft Type and Airworthiness Certification", Code of Federal Regulations (CFR), Aug. 21, 2014 (Aug. 21, 2014), pp. 900-970, XP055564084, Retrieved from the Internet: URL:https://www.govinfo.gov//www.govinfo.gov/content/pkg/CFR-2011-title14-vol1/pdf/CFR-2011-title14-vol1-part36.pdf [retrieved on Mar. 4, 2019].

* cited by examiner

SYSTEMS AND METHODS FOR GENERATING AVIONIC DISPLAYS INCLUDING FORECAST BOOM TOLERANCE THRESHOLD EXCEEDANCE SYMBOLOGY

STATEMENT REGARDING FEDERALLY SPONSORED RESEARCH OR DEVELOPMENT

This invention was made with Government support under Contract No. NND15AA35C, awarded by NASA/Armstrong Flight Research Ctr. The Government has certain rights in the invention.

TECHNICAL FIELD

The following disclosure relates generally to avionic display systems and, more particularly, to avionic display systems and methods for generating avionic displays including symbology useful in decreasing the likelihood of boom tolerance threshold exceedance due to constructive interference between pressure waves.

Abbreviations

Abbreviations appearing relatively infrequently in this document are defined upon initial usage, while abbreviations appearing more frequently in this document are defined below.
- A/C—Aircraft;
- AGL—Above Ground Level;
- ATC—Air Traffic Controller;
- FMS—Flight Management System;
- HNAV—Horizontal Navigation;
- PFD—Primary Flight Display;
- UAV—Unmanned Aerial Vehicle; and
- VNAV—Vertical Navigation.

BACKGROUND

Regulatory authorities currently restrict over-land supersonic flight of civilian A/C throughout much of the populated world. In the United States, for example, current Federal Aviation Administration (FAA) regulations prohibit supersonic flight of civilian A/C over land. Such restrictions are generally motived by noise abatement rationale and a desire to protect ground structures, such as building windows, from damage due to the pressure waves generated during supersonic air travel. These concerns notwithstanding, regulatory authorities have indicated that existing supersonic over-land flight restrictions might soon be eased, within certain limits. Industry attention has thus turned to the development and production of so-called "low boom" A/C suitable for service as commercial airliners or passenger jets operable at lower Mach speeds. As industry efforts increasingly focus on the development of low boom A/C, a corresponding demand arises for the development of tools and systems supporting civilian A/C engaged in supersonic flight, while ensuring adequate control of the pressure waves and noise levels produced by such supersonic air travel.

BRIEF SUMMARY

Avionic display systems and methods are provided for generating avionic displays including symbology decreasing the likelihood of boom tolerance threshold exceedance (an overpressure events) due to potential constructive interference between pressure waves, which are generated by A/C engaged in supersonic flight. In various embodiments, the avionic display system includes a display device on which an avionic display is generated. A controller architecture is operably coupled to the display device and configured to determine when an overpressure event may potentially occur in a future timeframe (that is, when there arises the future possibility or risk of an overpressure event) due to constructive interference between colliding pressure waves, which are forecast to occur during the impending supersonic flight of one or more A/C. When determining that an overpressure event may potentially occur in the future timeframe due to constructive interference between pressure waves, the controller architecture further generates symbology or other graphics on the avionic display indicative of the potential occurrence of the overpressure event.

In another embodiment, the avionic display system includes a display device on which an avionic display is generated, a controller architecture operably coupled to the display device, and storage media containing a computer-executable code or instructions. When executed by the controller architecture, the computer-executable code causes the avionic display system to perform the operations of: (i) forecasting whether constructive interference may occur between sonic pressures waves generated by A/C traveling through an airspace; (ii) when forecasting that constructive interference may occur, calculating a maximum combined amplitude potentially resulting from the constructive interference; and (iii) when the maximum combined amplitude exceeds a boom tolerance threshold, generating symbology on the avionic display indicative of a potential overpressure event. In certain embodiments, the controller architecture is further configured to assign a value to the boom tolerance threshold based, at least in part, on a geographical location at which constructive interference may occur between the sonic pressure waves.

Methods for generating avionic displays including forecast overpressure event symbology are further provided. The method may be carried-out by an avionic display system including a display device and a controller architecture, which is operably coupled to the display device. In one embodiment, the method includes the step or process of forecasting whether an overpressure event may occur as a result of constructive interference between pressures waves generated during supersonic flight of one or more A/C, as projected into a future timeframe. When forecasting that an overpressure event may occur, a visual indication is generated or produced on the display device conveying the potential future occurrence of the overpressure event. In certain instances, the method may further include the steps or processes of: (i) estimating a maximum combined amplitude potentially resulting from constructive interference between the pressure waves generated during supersonic A/C flight; and (ii) determining that the overpressure event may occur due to constructive interference between pressure waves when the maximum combined amplitude exceeds a boom tolerance threshold.

The methods set-forth above and described elsewhere in this document can be implemented utilizing program products, such as software applications executed on suitably-equipped avionic display systems and disseminated in any suitable manner. Various additional examples, aspects, and other useful features of embodiments of the present disclosure will also become apparent to one of ordinary skill in the relevant industry given the additional description provided below.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect.

As appearing herein, the term "avionic display" refers to a computer-generated display depicting the flight environment of at least one A/C. Similarly, the term "avionic display system" refers to a system that generates at least one avionic display during system operation. The term "avionic" may be thus regarded as synonymous with the term "A/C-related" in the context of this document. The usage of the term "avionic," then, does not require that the avionic display system is necessarily deployed onboard an A/C in all instances. Indeed, in many implementations, some or all of the components of the avionic display system will be located offboard any particular A/C. This may be the case when, for example, the avionic display system is utilized to pilot a UAV and certain components of the display system are located within the facility from which the UAV is controlled. This may also be the case when the avionic display system is utilized in directing or managing supersonic air traffic, in which case the display system may reside within a control tower, within an ATC facility, or within another non-A/C location.

INCORPORATION BY REFERENCE

The following application, which is owned by the present assignee at the time of filing this document with the United States Patent and Trademark Office (USPTO), generally relates to the present subject matter, and is hereby incorporated by reference: U.S. patent application Ser. No. 15/798,692, entitled "SYSTEMS AND METHODS FOR GENERATING AVIONIC DISPLAYS INCLUDING FORECAST OVERPRESSURE EVENT SYMBOLOGY", filed with the United States Patent and Trademark Office on Oct. 31, 2017, and assigned to the assignee of the instant Application, Honeywell International Incorporated.

OVERVIEW

Avionic display systems and methods are provided for generating avionic displays, which include symbology useful in decreasing the likelihood of boom tolerance threshold exceedance (herein, an "overpressure event") due to potential constructive interference between sonic pressure waves. During operation, the avionic display system determines whether an overpressure event may occur due constructive interference between pressure waves, which are predicted to collide during the impending supersonic flight of one or more A/C. When determining that an overpressure event may result from constructive interference between colliding pressure waves, the avionic display system provides a visual indication of the potential overpressure event. The visual indication can include or assume the form of a text annunciation warning of the potential future occurrence of the overpressure event, as generated on one or more avionic displays. Additionally or alternatively, the visual indication can include or assume the form symbology identifying a geographical location at which the pressure waves are predicted to collide. Such symbology may also visually convey other information pertaining to the potential overpressure event, such as a projected maximum severity of the overpressure event should constructive interference between the colliding pressure waves occur and/or a geographical location at which the combined pressure wave (the product of colliding pressure waves) is projected to initially impact a surface of the Earth.

Embodiments of the avionic display system can utilize different data sources and analysis techniques to assess whether an overpressure event may potentially result from constructive interference between colliding pressure waves. In certain implementations, the avionic display system repeatedly obtains sonic boom forecast data from a remote entity, such as a cloud-based service dedicated to performing sonic boom forecasting algorithms, and utilizes the forecast data in determining whether an overpressure event can result from constructive interference during pressure wave collision, should such constructive interference occur. For example, in such implementations, the avionic display system may submit a series of "what-if" requests to the remote entity for sonic boom predictions based upon the predicted flight parameters of one or more A/C, as projected into a future timeframe based upon current flight vector data, flight plan information, flight performance models, weather and wind conditions, and/or other such factors. After obtaining the sonic boom forecast data, the avionic display system then analyzes the data to determine whether a collision between pressure waves is predicted during impending supersonic A/C flight. If a pressure wave collision is predicted, the avionic display system further estimates or calculates a maximum combined amplitude potentially resulting from the pressure wave collision should constructive interference occur. If the maximum combined amplitude exceeds a predetermined boom tolerance threshold, the avionic display system then provides a visual indication of the potential overpressure event on the appropriate avionic display or displays.

The usage of a boom tolerance threshold in evaluating the future possibility or risk of overpressure event occurrences provides flexibility in implementing the avionic display system. When the boom tolerance threshold is set at a relatively low value, only sonic booms of a relatively low intensity may be permitted during supersonic A/C flight, if permitted at all. Conversely, when the boom tolerance threshold is set at a relatively high value, sonic booms having greater intensities (higher pressure and/or decibel levels) may be permitted during supersonic A/C flight. The avionic display system may leverage this flexibility in embodiments by assigning a particular value to the boom tolerance threshold based upon one or more factors pertaining to a predicted pressure wave collision prior to the above-described evaluation process or comparison step. For example, when evaluating whether an overpressure event may potentially result due to constructive interference between colliding pressure waves, the avionic display system may assign the boom tolerance threshold an appropriate value as a function of a geographical location at which the pressure wave collision is predicted to take place, as a function of a particular ground strike location associated with the overpressure event, and/or as a function of a time of day at which the pressure wave collision is predicted to occur. In this manner, the boom tolerance threshold may be assigned higher (more permissive) values when appropriate, such as when pressure wave collision is predicted to occur over an unpopulated geographical region or large body of water, above a municipality having non-stringent noise regulations, and/or during waking hours, to list but a few examples.

Embodiments of the avionic display system may provide other beneficial features, as well. For example, in further implementations, the avionic display system may determine and present suggested preemptive actions or "navigational solutions," which can be performed by one or more A/C to avert the potential occurrence of a forecast overpressure event. Description of such navigational solutions and other functionalities usefully performed by the avionic display system is provided below. First, however, an overarching description of an exemplary avionic display system suitable for generating forecast overpressure event symbology, including symbology and other graphics pertaining to overpressure events potentially resulting from constructive interference between colliding pressure waves, is set-forth in conjunction with FIG. 1.

Figure 1:
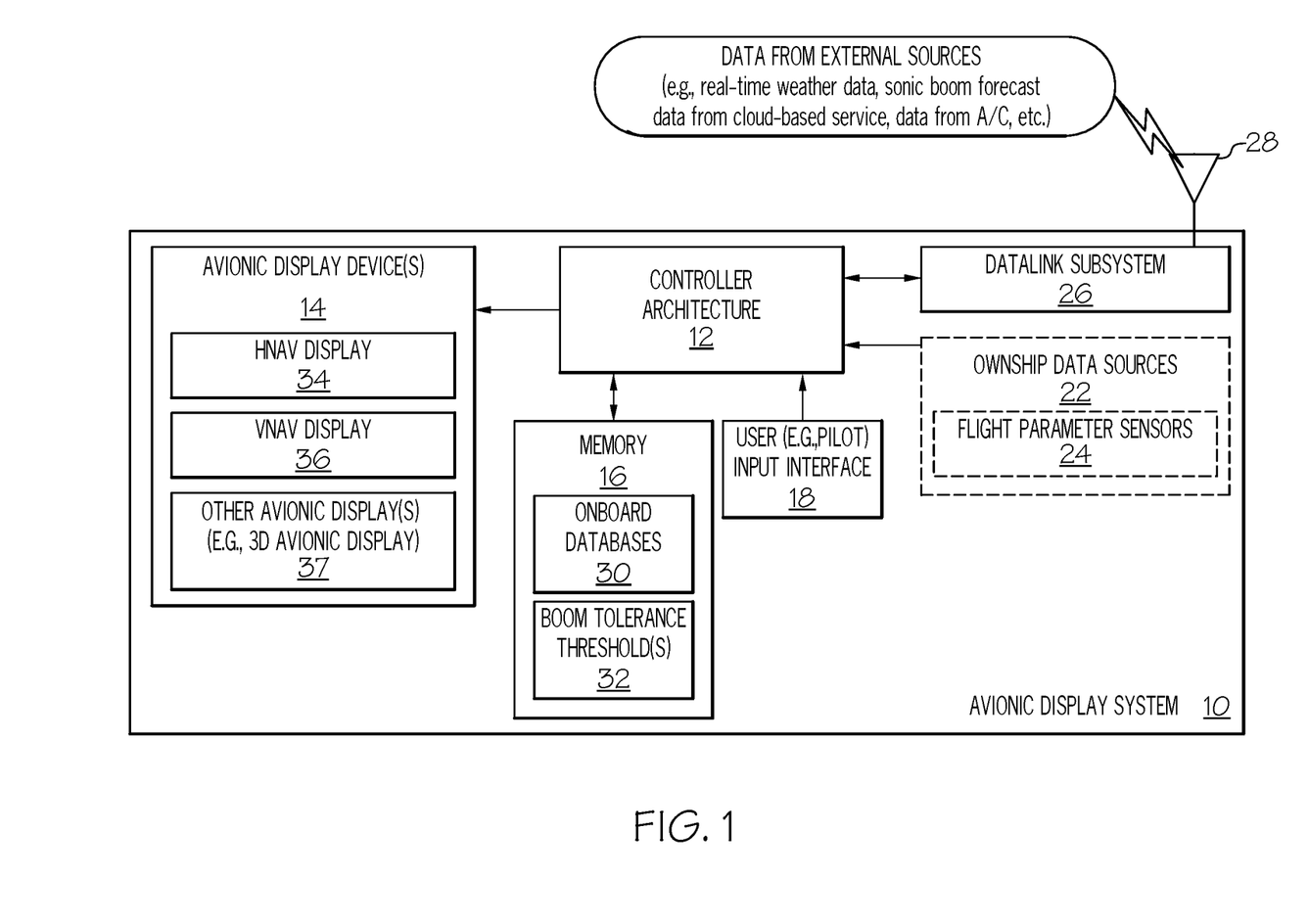
FIG. 1 is a block diagram of an avionic display system configured to generate one or more avionic displays including symbology indicative of forecast overpressure events potentially resulting from constructive interference between colliding pressure waves, as illustrated in accordance with an exemplary embodiment of the present disclosure.

Example of Avionic Display System Suitable for Generating Avionic Dipslays Including Forecast Overpressure Event Symbology FIG. 1 is a block diagram of an avionic display system 10, as illustrated in accordance with an exemplary and non-limiting embodiment of the present disclosure. As schematically shown, avionic display system 10 includes the following components or subsystems, each of which may assume the form of a single device or multiple interconnected devices: (i) a controller architecture 12, (ii) at least one avionic display device 14, (iii) computer-readable storage media or memory 16, and (iv) a user input interface 18. In embodiments in which avionic display system 10 is utilized to pilot an A/C, avionic display system 10 may further contain a number of ownship data sources 22 including, for example, an array or constellation of flight parameter sensors 24. In other embodiments, such as when display system 10 is utilized in directing or managing supersonic air traffic, avionic display system 10 may not contain ownship data sources 22, as indicated the usage of phantom line. As further shown in FIG. 1, avionic display system 10 may also contain a datalink subsystem 26 including an antenna 28, which may wirelessly transmit data to and receive data from various sources external to display system 10. Such external sources can include, for example, ATC stations, A/C, weather forecasting services, and remotely-located sonic boom forecasting services, as discussed more fully below.

When display system 10 is utilized to pilot a manned "ownship" A/C, the various components of avionic display system 10 may be wholly located onboard the ownship A/C. Comparatively, in embodiments in which avionic display system 10 is utilized to pilot a remotely-controlled UAV or other remotely-piloted A/C, certain components of avionic display system 10 may be carried by the UAV, while other components may be situated at the ground-based station or other facility from which the UAV is piloted. For example, in this latter instance, avionic display device(s) 14, user input interface 18, and some portion of memory 16 may be located offboard the UAV. Finally, when utilized to direct or to manage supersonic air traffic (rather than in directly piloting an UAV or manned A/C), avionic display system 10 may not be deployed onboard any particular A/C, but rather situated in a control tower, in a ground-based ATC station, or in a similar location. In this latter regard, and as further discussed below, embodiments of avionic display system 10 may be particularly well-suited for directing air traffic converging on a particular airfield or airport under circumstances in which certain A/C are permitted to approach and depart the airfield or airport at supersonic speeds.

As generically illustrated in FIG. 1, controller architecture 12 includes at least first, second, third, and fourth inputs, which are operatively coupled to user input interface 18, to memory 16, to ownship data sources 22 (when present), and to datalink subsystem 26, respectively. Controller architecture 12 also includes at least first, second, and third outputs, which are operatively coupled to avionic display device(s) 14, to memory 16, and to datalink subsystem 26, respectively. In further embodiments, avionic display system 10 may include a greater or lesser number of components, which may be interconnected in differing manners utilizing any combination of wireless or hardline (e.g., avionic bus) connections. Although avionic display system 10 is schematically illustrated in FIG. 1 as a single unit, the individual elements and components of avionic display system 10 can be implemented in a distributed manner using any number of physically-distinct and operatively-interconnected pieces of hardware or equipment, as previously indicated. Similarly, user input interface 18 can include various different types of hardware or software components, such as touchscreen devices, cursor devices, keyboards, voice recognition modules, and the like, suitable for recognizing input received from a pilot, an ATC personnel member, or other user of avionic display system 10.

Avionic display device(s) 14 can include any number and type of image generating devices on which one or more avionic displays may be generated. When avionic display system 10 is utilized to pilot a manned A/C, avionic display device(s) 14 may be affixed to the static structure of the A/C cockpit as, for example, one or more Head Down Display (HDD) or Head Up Display (HUD) units. Alternatively, avionic display device(s) 14 may be include or assume the form of a movable display device (e.g., a pilot-worn display device) or a portable display device, such as an Electronic Flight Bag (EFB), a laptop, or a tablet computer, which is carried into the A/C cockpit by a pilot or other aircrew member. Similarly, when avionic display system 10 is utilized to pilot a UAV or remotely-piloted A/C, display device(s) 14 may be realized as one or more HDD or HUD units affixed to the static structure of a control facility, portable electronic device(s) carried into such a control facility, or movable display devices worn by a pilot when remotely operating the UAV. Finally, when avionic display system 10 is utilized to direct or manage supersonic air traffic, display device(s) 14 can be realized as any of the aforementioned display types including one or more HDD display units, HUD display units, portable electronic devices, and head-worn display devices.

As appearing herein, the term "controller architecture" broadly refers to the components of avionic display system 10 dedicated to carrying-out and otherwise supporting processing functionalities. Accordingly, as schematically depicted in FIG. 1, controller architecture 12 can encompass or be associated with one or more processors, flight control computers, navigational equipment pieces, computer-readable memories (including or in addition to memory 16), power supplies, storage devices, interface cards, and other standardized components. Controller architecture 12 may also include or cooperate with any number of firmware and software programs or computer-readable instructions designed to carry-out the various process tasks, calculations, and control/display functions described herein. Controller architecture 12 may also exchange data with one or more external sources, such as a cloud-based service or server farm, in various embodiments of avionic display system 10. In this case, bidirectional wireless data exchange may occur over a communications network, such as a public or private network implemented in accordance with Transmission Control Protocol/Internet Protocol architectures or other conventional protocols. Encryption and mutual authentication techniques may be applied, as appropriate, to ensure data security.

Memory 16 can encompass any number and type of storage media suitable for storing computer-readable code or instructions, as well as other data utilized to support the operation of avionic display system 10. In certain embodiments, memory 16 may store one or more databases 30, such as geographical (terrain), runway, navigational, and historical weather databases. Such databases 30 are usefully updated on a periodic basis to maintain data timeliness; and, in embodiments in which display system 10 is utilized to pilot a manned A/C, the databases maintained in memory 16 may be shared by other systems onboard the A/C, such as an Enhanced Ground Proximity Warning System (EGPWS) or a Runway Awareness and Advisory System (RAAS). In other cases, one or more of databases 30 may be maintained by an external entity, such as a cloud-based service, which can be accessed by controller architecture 12 when needed. As generically represented in FIG. 1 by box 32, memory 16 may further store one or more values associated with the below-described boom tolerance threshold. Additionally, one or more A/C-specific sonic boom profiles may be stored within memory 16. For example, in embodiments in which display system 10 is utilized to pilot a UAV or a manned A/C, memory 16 may store a sonic boom profile specific to an A/C on which display system 10 is deployed. In other embodiments, memory 16 may store a plurality of A/C-specific sonic boom profiles associated with varying types of A/C in, for example, a multidimensional look-up table.

As previously indicated, avionic display system 10 can include a number of flight parameter sensors 24 when, for example, display system 10 is utilized for piloting an A/C. When present, flight parameter sensors 24 supply various types of data or measurements to controller architecture 12 during A/C flight. A non-exhaustive list of such data includes initial reference system measurements, Flight Path Angle (FPA) measurements, airspeed data, groundspeed data, altitude data, attitude data including pitch data and roll measurements, yaw data, data related to A/C weight, time/date information, heading information, data related to atmospheric conditions, flight path data, flight track data, radar altitude data, geometric altitude data, wind speed and direction data, and fuel consumption data. Further, in such embodiments, controller architecture 12 and the other components of avionic display system 10 may be included within or cooperate with any number and type of systems commonly deployed onboard A/C including, for example, an FMS, an Attitude Heading Reference System (AHRS), an Instrument Landing System (ILS), and an Inertial Reference System (IRS), to list but a few examples.

During operation, avionic display system 10 generates one or more avionic displays on avionic display device(s) 14. For example, as schematically indicated in FIG. 1, avionic display system 10 may generate a horizontal navigation or "HNAV" display 34 on avionic display device(s) 14. As appearing herein, the term "horizontal navigation display" or, more succinctly, "HNAV display" refers to an avionic display presented from a top-down or planform viewpoint. In addition to or in lieu of HNAV display 34, at least one vertical navigation display 36 may be generated on avionic display device(s) 14 in embodiments of display system 10; the term "vertical navigation display" or "VNAV display" referring to an avionic display presented from a side or lateral viewpoint (also commonly referred to as a "vertical situation display"). In many implementations, avionic display system 10 may generate displays 34, 36 concurrently; e.g., in such embodiments, displays 34, 36 may be presented on separate screens of multiple display devices 14 or, instead, on a single screen of a display device 14 in a picture-in-picture or side-by-side format. In other implementations, display system 10 may only generate one of HNAV display 34 and VNAV display 36 at a given point in time. In other embodiments, avionic display system 10 may generate only a single display type, such as HNAV display centered on an airfield or airport (also commonly referred to as an "ATC display") when display system 10 is utilized for directing or managing air traffic.

While the present description primarily focuses on the forecast overpressure event symbology in the context of two dimensional (2D) avionic displays, such as HNAV display 34 and VNAV display 36, it is emphasized that embodiments of avionic display system 10 can generate the forecast overpressure event symbology (and the related graphics described throughout this document) on any number and type of avionic displays, which depict the flight environment of one or more A/C. For example, in further implementations, the forecast overpressure event symbology can be generated on one or more 3D avionic displays, such as a PFD or an exocentric 3D avionic display, in addition or in lieu of one or more 2D avionic displays. This possibility is further indicated in FIG. 1 by the inclusion of the "other" avionic display block 37, which is contained within the larger avionic display device(s) block 14 of avionic display system 10. This stated, an exemplary method, which is usefully implemented by avionic display system 10 in generating one or more of avionic displays 34, 36, 37 to selectively include forecast overpressure event symbology, will now be described in conjunction with FIG. 2.

Figure 2:
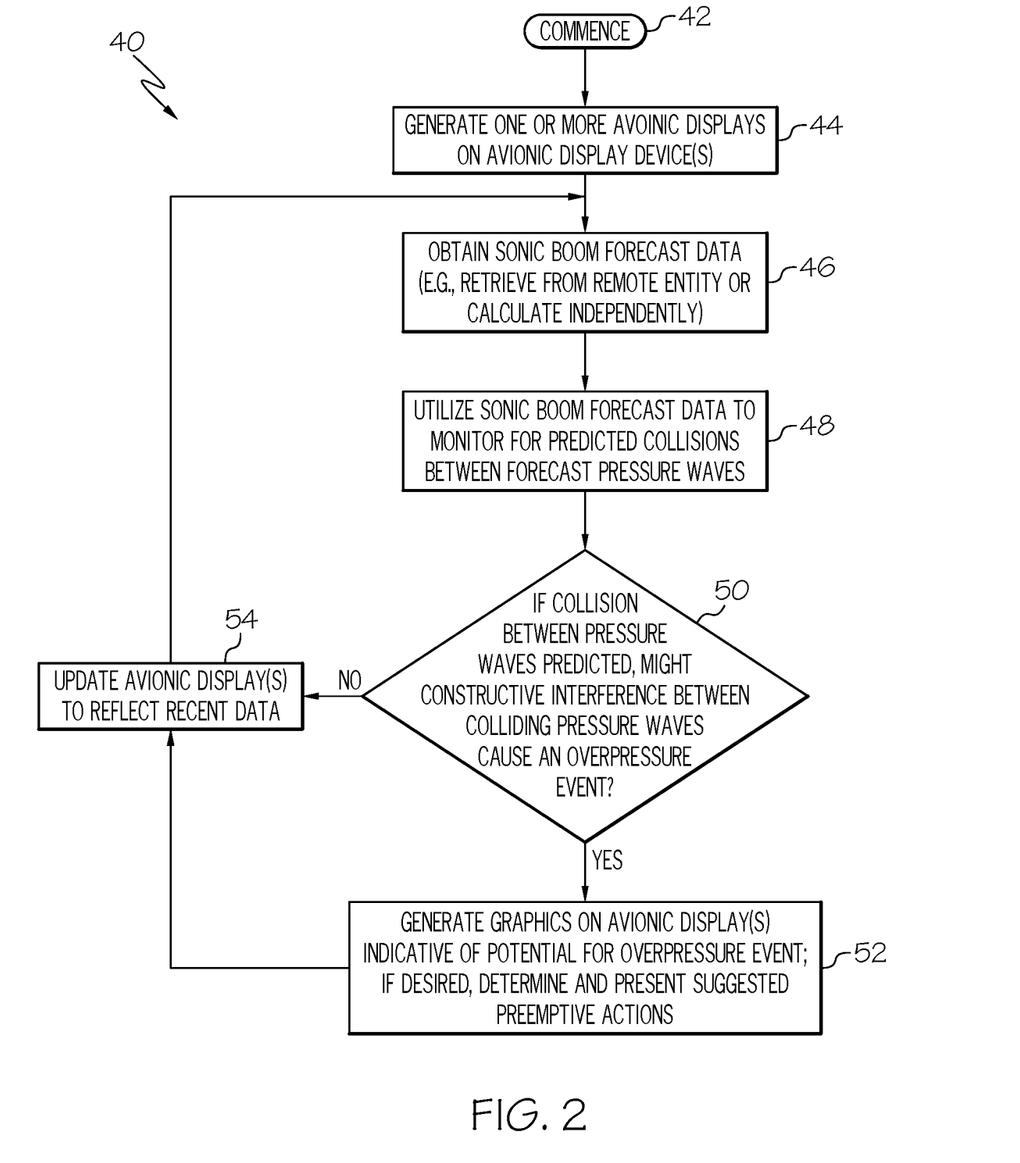
FIG. 2 is a flowchart setting-forth an exemplary process carried-out by avionic display system of FIG. 1 when generating one or more avionic displays including symbology indicative of forecast overpressure events.

Examples of Methods for Generating Avionic Display(S) Including Forecast Overpressure Event Symbology FIG. 2 is a flowchart setting-forth an exemplary method 40, which can be carried-out by avionic display system 10 (FIG. 1) to generate symbology useful in identifying and averting the occurrence of forecast overpressure events, including those events potentially resulting from constructive interference between colliding pressure waves occurring during supersonic A/C flight. As set-forth in FIG. 2, method 40 includes a number of computer-implemented functions or process steps identified as STEPS 42, 44, 46, 48, 50, 52, 54. Depending upon the particular manner in which method 40 is implemented, each step generally illustrated in FIG. 2 may entail a single process or multiple sub-processes. Furthermore, the steps illustrated in FIG. 2 and described below are provided by way of non-limiting example only. In alternative embodiments of method 40, additional process steps may be performed, certain steps may be omitted, and/or the illustrated steps may be performed in alternative sequences.

Referring jointly to FIGS. 1-2, method 40 commences at STEP 42. Method 40 may commence when avionic display system 10 initially becomes operational and may be performed repeatedly or iteratively until system shutdown. Alternatively, method 40 may commence in response to receipt of user input received via user input interface 18; e.g., as entered by a pilot, ATC personnel member, or other user of avionic display system 10. As a still further possibility, method 40 may commence in response to the occurrence of a specified trigger event. For example, when avionic display system 10 is utilized for piloting an ownship A/C, method 40 may automatically commence (that is, initiate without requiring additional user input) when the ownship A/C surpasses a predetermined speed threshold, such as a threshold slightly above or below Mach 1 or a predetermined (static or dynamic) airspeed threshold; here, noting that any such airspeed threshold may be varied as a function of weather conditions affecting the speed of sound within the ambient environment. Method 40 may then be performed iteratively or repeatedly, preferably on a relatively rapid (e.g., real-time) basis, until such time as the A/C ceases supersonic flight or is no longer projected to travel at supersonic speeds during the present flight cycle.

After commencing at STEP 42, method 40 advances to STEP 44. During STEP 44, avionic display system 10 generates one or more avionic displays on avionic display device(s) 14. As discussed above, the particular avionic display or displays generated during STEP 44 will vary among embodiments in relation to various factors, such as whether display system 10 is utilized for piloting purposes or for managing supersonic air traffic. In many embodiments, avionic display system 10 generates an HNAV display during STEP 44 corresponding to HNAV display 34 schematically shown in FIG. 1. Specific exemplary implementations of HNAV display 34 are described below in conjunction with FIGS. 3-4. Additionally or alternatively, avionic display system 10 may also produce an VNAV display during STEP 44 corresponding to VNAV display 36 shown in FIG. 1. A specific exemplary implementation of VNAV display 36 is further discussed below in conjunction with FIG. 5. In other embodiments, and as previously noted, avionic display system 10 may generate other types of avionic displays, such as 3D avionic displays, during STEP 44 in addition to or in lieu of an HNAV display and/or a VNAV display.

Progressing to STEP 46 of method 40, avionic display system 10 next obtains the appropriate data for usage in generating the forecast overpressure event symbology. This data includes so-called "sonic boom forecast data"; that is, data describing whether the impending supersonic flight of one or more A/C is predicted or anticipated to generate supersonic pressure waves or sonic booms. The sonic boom forecast data also usefully indicates the projected locations and intensities of such sonic boom predictions. For example, in embodiments, the sonic boom forecast data may contain time-phased data specifying the anticipated locations, spread, and intensities of pressure waves resulting from sonic boom predictions, as mapped throughout a three dimensional airspace. As a point of emphasis, the sonic boom forecast data can be generated utilizing any suitable algorithms or processes, which are carried-out by avionic display system 10 itself, by another entity in communication with display system 10, or by a combination thereof. In some implementations, avionic display system 10 may outsource selected processing tasks related to the generation of sonic boom forecast data to a remote entity, such as a cloud-based service or server farm. For example, avionic display system 10 may submit a series of "what-if" queries or data requests to a remote entity and receive, in return, sonic boom predictions. Such "what-if" queries may include projected flight parameters for an A/C, as extrapolated into a future timeframe, and generated by display system 10 utilizing established A/C performance models, current flight vector data, flight plan information (if known), and other such data inputs. In this manner, relatively complex, computationally-intensive forecasting algorithms can be performed by the remote external entity to increase the speed and accuracy with which the sonic boom forecast data is generated, while processing demands placed on controller architecture 12 are reduced.

The algorithms or processes utilized to generate the sonic boom forecast data during STEP 46 usefully consider a relatively wide range of static and dynamic inputs. Such inputs include meteorological conditions impacting the propagation of sonic pressure waves through the ambient environment, such as current wind speeds and directions, air temperatures, humidity levels, and information regarding the presence of airborne precipitation, such as rain, sleet, or snow. Data regarding current meteorological conditions may be extracted from XM weather broadcasts or other reports, which are transmitted by dedicated weather forecast services. Measurements of current meteorological conditions can be obtained from flight parameter sensors 24 when included within display system 10. Again, such factors can also be applied to virtual flight performance models, which are implemented by avionic display system 10 and/or a remote entity in wireless communication with display system 10 to project A/C flight parameters (positions, speeds, etc.) at various junctures in the future. In this case, display system 10 may then provide this information to a remote source for sonic boom predictions at selected intervals or increments along a predicted flight path or flight plan for the A/C. Alternatively, when avionic display system 10 obtains sonic boom predictions or other forecast data from a remote entity (e.g., a dedicated sonic boom forecasting service) in wireless communication with display system 10, the remote entity may itself predict the future location and flight parameters of A/C (single or plural) under consideration.

As indicated above, algorithms or processes utilized to generate the sonic boom forecast data usefully consider the predicted future flight parameters of one or more A/C capable of supersonic flight. For example, the FPA, speed, and location (longitude, latitude, and altitude) may be projected into a future timeframe utilizing established performance modules. Such future flight parameters may be predicted based upon the current flight vector data and flight trends of the A/C; e.g., the time-correlated position and supersonic speed of the A/C may be extrapolated into a future timeframe based upon the current speed, attitude, direction, and FPA of the A/C under consideration. In certain embodiments, such data may be transmitted to display system 10 from one or more A/C for which sonic boom predictions are carried-out. For example, when avionic display system 10 is utilized for air traffic management, current flight parameters of A/C within a monitored airspace may be determined from radar or reported by the A/C as, for example, Automatic Dependent Surveillance-Broadcast (ADS-B) transmissions. Such A/C may also provide flight plan information may also be provided to display system 10; e.g., A/C may convey flight plan information to avionic display system 10 when assuming the form of an ATC system or otherwise utilize to monitor air traffic traveling to and from a particular airfield.

In various embodiments of method 40, A/C-specific sonic boom profiles may be further taken into account when generating the sonic boom forecast data obtained during STEP 46. Such A/C-specific sonic boom profiles may represent the general three dimensional pressure wave shape created by a particular A/C when traveling at supersonic speeds. The sonic boom profile for a particular A/C may be constructed based the physical characteristics of the A/C, such as shape, weight class, and engine type. Avionic display system 10 may store one or more A/C-specific sonic boom profiles in memory 16 and recall such profiles during the course of method 40, on an as-needed basis. For example, avionic display system 10 may store a sonic boom profile specific to the ownship A/C in memory 16 and then recall this sonic boom profile when independently performing onboard forecasting algorithms. Alternatively, controller architecture 12 may recall and transmit the appropriate A/C-specific sonic boom profile or profiles, along with other pertinent data (e.g., current flight vector data and/or flight plan information) to a remote entity when requesting sonic boom forecast data or sonic boom predictions therefrom. As a still further possibility, when avionic display system 10 is utilized to monitor air traffic traveling in a particular airspace (e.g., traveling to and departing from a particular airfield), memory 16 may store a plurality of A/C-specific sonic boom profiles associated with various A/C. Display system 10 may then assign varying sonic boom profiles to each of the A/C under consideration during STEP 46 of method 40.

After obtaining the sonic boom forecast data (STEP 46), avionic display system 10 advances to STEP 48 of method 40. During STEP 48, avionic display system 10 interprets or analyzes the newly-obtained sonic boom forecast data. Specifically, as indicated in FIG. 2, avionic display system 10 may analyze the most recently-received sonic boom forecast data to determine whether a collision is predicted between pressure waves forecast to occur during upcoming supersonic A/C flight; and, when appropriate, further assess whether such a pressure wave collision might result in or trigger an overpressure event should constructive interference occur between the colliding pressure waves. In one approach, avionic display system 10 may construct and repeatedly update a pressure wave forecast map utilizing the sonic boom forecast data obtained during STEP 46, and then search or scan the pressure wave forecast map for regions in sonic pressures waves are predicted to collide. When locating a region of the map in which a pressure wave collision is predicted, display system 10 may then determine whether such a collision might result in a combined pressure wave of sufficient intensity to trigger an overpressure event if constructive interference should occur, as discussed more fully below in conjunction with STEP 50 of method 40. In other embodiments, avionic display system 10 may determine whether an overpressure event may occur by comparing a maximum possible amplitude outcome to a predetermined boom tolerance threshold (as discussed below), but without constructing such a pressure wave forecast map. Various different approaches may be employed to this end, with the following description provided by way of non-limiting illustration only.

Advancing to STEP 50 of method 40, avionic display system 10 next evaluates whether a precited collision between pressure waves could result in an overpressure event should constructive interference occur between the colliding pressure waves. One possible manner in which avionic display system 10 may perform this evaluation or assessment is as followings. First, avionic display system 10 estimates or calculates a maximum combined amplitude (e.g., pressure or decibel level) potentially resulting from constructive interference between the pressure waves generated during supersonic A/C flight. Stated informally, this may be considered a "worst case" scenario resulting from the anticipated pressure wave collision. Avionic display system 10 may then conclude or determine that an overpressure event may, in fact, occur when the maximum combined amplitude exceeds a predetermined boom tolerance threshold. As noted above, and as discussed more fully below, the boom tolerance threshold may have a static value in embodiments, but more usefully has a variable value that is actively adjusted by display system 10 based upon one or more characteristics of the predicted pressure wave collision under consideration. Further, in embodiments, the maximum combined amplitude may be considered at the origin of the potential overpressure event or, perhaps, at a ground strike location corresponding to the pressure wave collision; that is, a geographical location at which the cumulative or aggregate pressure wave resulting from the pressure wave collision is projected to first impact the Earth's surface (water or terrain). Generally stated, avionic display system 10 may estimate a cumulative pressure wave amplitude by summing the maximum amplitude of the two (or more) pressure waves at the projected intersection between the pressure waves or other selected location.

Here, it is noted that, while pressure wave collision will typically arise when two or more A/C pass within relatively close proximity, this need not always be the case. Indeed, in certain instances, pressure wave collision and, therefore, potential constructive interference between pressure waves can occur due to the actions of a single A/C engaged in supersonic flight. This may occur due to pressure wave reflection or bounce back from terrestrial features, particularly when an A/C is turning. Consider, for example, a scenario in which a first pressure wave generated by an A/C impacts the ground (or other terrestrial feature), reflects from the ground, and then encounters a second pressure wave (or, in other words, another portion of a singe, continuous pressure wave) generated by the same A/C. In this case, constructive interference between the pressure waves generated by the same A/C can occur. In other instances, the first pressure wave may reflect from the ground and subsequently collide with a second pressure wave generated by another A/C. Thus, various different scenarios are possible in which two or more sonic pressure waves may collide following pressure wave reflection. For this reason, the potential reflection of sonic pressure waves from terrestrial objects is usefully considered during STEPS 48, 50, as discussed below.

When considering pressure wave reflection during STEPS 48, 50 of method 40, terrain topology and type can be determined; e.g., by recollection from geographical database 30 or other data source contained in memory 16. Terrain topology and type may then be considered when evaluating whether a particular sonic pressure wave is likely to be reflected from a terrestrial object, such as the ground, a mountain, or a body of water. Ground topography may be considered to, for example, estimate the AGL altitude of an A/C generating a sonic boom or pressure wave, as well as the general angle range at which such terrestrial features may reflect sonic pressure waves. Terrestrial surface cover type may further be taken into account to estimate the degree to which a particular terrestrial surface or surface covering may help dissipate a sonic wave upon impact. For example, little to no pressure wave dissipation or absorption may be anticipated when a pressure wave is reflected from a bare ground surface, while an appreciable amount of pressure wave dissipation is reasonably expected when pressure wave reflection occurs from a terrestrial surface covered by relatively dense vegetation.

As indicated above, avionic display system 10 further assigns a value to the boom tolerance threshold for comparison purposes in determining whether the magnitude of a combined sonic boom exceeds the boom tolerance threshold during STEP 50 of method 40. In certain cases, a single or universal boom tolerance threshold value may be utilized and recalled from memory 16 when needed. In this relatively simple case, avionic display system 10 may allow the value of the boom tolerance threshold to be adjusted by, for example, software updates or user input received via interface 18. In other embodiments, the boom tolerance threshold may have a variable value; that is, a value that is actively adjusted based upon one or more parameters pertaining to a pressure wave collision. Data stored within memory 16 may correlate multiple boom tolerance threshold values to varying geographical zones, to different times of day, and/or other differentiating factors. For example, in this case, the boom tolerance threshold values may be georeferenced; that is, differentiated by geographical region. This enables the value of the boom tolerance threshold to be adjusted based upon population density, local or regional noise abatement regulations, political boundaries, proximity to land if a sonic boom is forecasted to originate over water, and other such factors. As a specific example, the value of the boom tolerance threshold may be increased (rendered more permissive) for geographical areas having lower population densities and decreased (rendered more stringent) for geographical areas having greater population densities or infrastructure vulnerable to pressure wave damage. Additionally or alternatively, the boom tolerance thresholds may be correlated to time-of-day; e.g., the values of sonic boom threshold may be increased (rendered more permissive) during waking hours and decreased (rendered more stringent) at night.

If, at STEP 50, display system 10 determines that constructive interference between colliding pressure waves (if such constructive interference should occur) would still be insufficient to trigger an overpressure event, avionic display system 10 progresses to STEP 54 and updates avionic display(s) 34, 36 in accordance with the most recently-gathered data inputs. Avionic display system 10 then returns to STEP 46, and method 40 loops or repeats until termination. Conversely, if display system 10 determines that an overpressure event may potentially occur due to constructive interference between colliding pressure waves, avionic display system 10 progress to STEP 52, as described more fully below. In this manner, symbology pertaining to pressure wave collision is generated on the appropriate avionic display(s) only when such pressure wave collision could induce an overpressure event should constructive interference occur. This helps ensure that a viewer of display system 10 is presented with relevant, actionable information, while the avionic display(s) are decluttered. These advantages notwithstanding, avionic display system 10 may generate graphics indicative of pressure wave collision event when insufficient to trigger an overpressure event in alternative embodiments of display system 10.

Turning lastly to STEP 52 of method 40, during this process step avionic display system 10 generates a visual indication of the potential overpressure event on the appropriate avionic display or displays. Such a visual indication can include text annunciations and/or symbology identifying various pertinent information pertaining to the potential occurrence of the overpressure event. For example, such symbology may identify a location at which the pressure waves, which are potentially subject to constructive interference, are predicted to collide. Such symbology may also convey the maximum projected severity and/or likelihood of such an overpressure event as indicated by, for example, the below-described visual coding. If desired, avionic display system 10 may also present suggested preemptive actions for averting or avoiding the potential occurrence of forecast overpressure events during STEP 52. Such preemptive actions are referred to herein as "navigational solutions" and can include speed reductions, altitude increases, and flight path alterations, which can be implemented by the appropriate A/C ahead of a forecast overpressure event to avert the potential occurrence thereof. Afterwards, avionic display system 10 may advance to STEP 54 such that method 40 repeats until termination. Additional discussion of exemplary avionic displays, forecast overpressure event symbology, and perhaps suggested navigational solutions suitably generated by avionic display system 10 during STEPS 52, 54 of method 40 will now be described in conjunction with FIGS. 3-5.

Examples of Avionic Displays Including Forecast Overpressure Event Symbology

Figure 3:
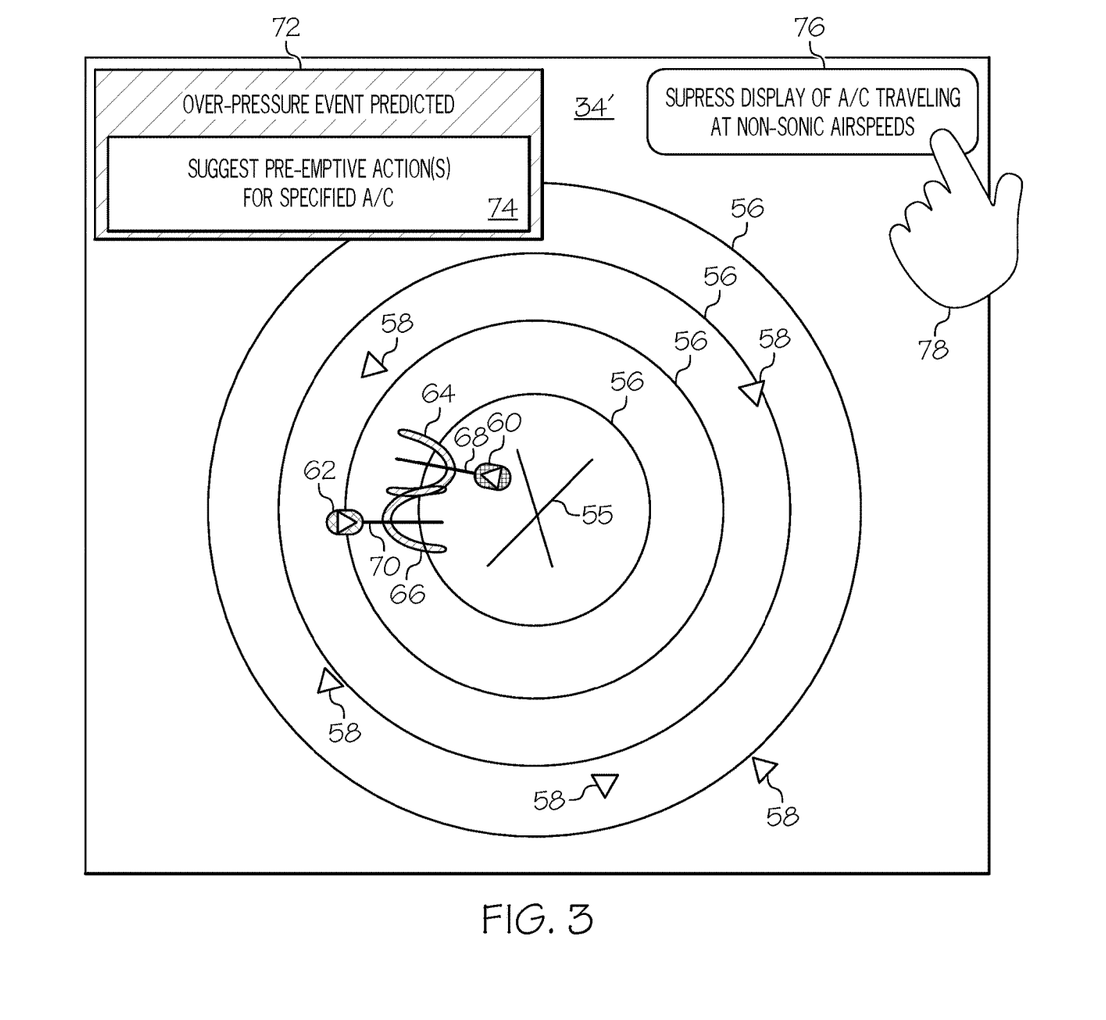
FIG. 3 is a screenshot of an exemplary HNAV display, which can be generated by the avionic display system shown in FIG. 1 and which includes symbology indicative of the potential occurrence of an overpressure event due to constructive interference between pressure waves, as illustrated in a first flight scenario.

FIG. 3 is a screenshot of an exemplary HNAV display 34', which may be generated by avionic display system 10 (FIG. 1) during STEP 52 of method 40 (FIG. 2) in a first exemplary flight scenario. Here and elsewhere in the following description, reference numerals 34, 36 are carried-over from the schematic of FIG. 1 for consistency. These reference numerals are appended with the addition of a prime symbol (') or a double prime symbol ("), however, to help emphasize that the particular appearance of HNAV and VNAV displays (and/or other avionic displays generated by display system 10) will vary among different embodiments and, in certain instances, may be customizable by a user or customer. Further, in the example of FIG. 3, HNAV display 34' depicts an airspace through which A/C may travel when approaching or departing from an airfield, which is represented by airfield icon 55. The embodiment of HNAV display 34' may therefore be considered a type of "ATC" display well-suited for supporting decision making when managing or directing supersonic air traffic and will consequently be primarily described in this context. This notwithstanding, the possibility that HNAV display 34' may be utilized in directly piloting an A/C, which carries display system 10, is not precluded.

In the illustrated example, HNAV display 34' includes a number of range rings 56, which are concentrically positioned with respect to airfield icon 55. A plurality of A/C icons 58, 60, 62 indicate the horizonal positions (latitude and longitude) of A/C traveling through the depicted airspace surrounding the airfield represented by icon 55. Symbology or other graphics are further produced HNAV display 34' identifying those A/C projected to generate sonic pressure waves, which are potentially subject to constructive interference driving an overpressure event. Thus, in keeping with the foregoing description, avionic display system 10 generates a visual notification on HNAV display 34 to signify that an overpressure event may be triggered should constructive interference occur between the colliding pressure waves. In the example of FIG. 3, specifically, avionic display system 10 has determined that pressure waves generated during the impending supersonic flight of the A/C represented by icons 60, 62 can potentially combine to cause an overpressure event. This is visually expressed in FIG. 3 by intersecting sonic boom symbols 64, 66 associated with the A/C represented by icons 60, 62, respectively.

As shown in FIG. 3, intersecting sonic boom symbols 64, 66 are presented as a graphic or icon having a generally parabolic shape; however, the shape, dimensions, and prominence of symbols 64, 66 will vary amongst embodiments. For added clarity, sonic boom symbol 64 is visually linked to A/C icon 60 by flight path graphic 68, while sonic boom symbol 66 is visually linked to A/C icon 62 by flight path graphic 70. This allows an ATC personnel member or other viewer of HNAV display 34' to quickly ascertain which A/C are responsible for the potential occurrence or future risk of an overpressure event. As indicated in FIG. 3 by cross-hatching, sonic boom symbols 64, 66 may be generated in a visually-striking color, such as a red; and/or an amination (e.g., flashing) may be applied to intersecting sonic boom symbols 64, 66 to draw attention thereto. In other embodiments, the coloring or other aspect of sonic boom symbols 64, 66 may be varied to convey other pertinent information, such as the predicted likelihood and/or maximum possible severity of the potential overpressure event, as described more fully below.

In certain embodiments, symbols 64, 66 may be visually coded to indicate the predicted likelihood and/or maximum possible severity of the potential overpressure event. For example, in one approach, sonic boom symbols 64, 66 may be color coded to a pre-established warning color (e.g., amber) when the overpressure event is relatively unlikely to occur and/or is predicted to be moderate in severity. In other instances, sonic boom symbols 64, 66 may be color coded to a pre-established alert color (e.g., red) and possibly otherwise visually emphasized (e.g., by upscaling) when the overpressure event is relatively likely to occur and/or is predicted to be relatively intense in severity. In various embodiments, the projected severity of the overpressure event may be determined based upon a calculated disparity between the boom tolerance threshold and the estimated maximum combined amplitude potentially resulting from constructive interference between the colliding pressure waves represented by intersecting sonic boom symbols 64, 66. In other implementations, additional stages or categories of visual coding can be applied, with elevated levels of urgency assigned to the coding based upon, for example, the increased likelihood and/or maximum possible severity of the anticipated overpressure event. Animation effects or other visual changes can also be applied, as appropriate, for further visual emphasis. Finally, if desired, a visual warning alert (e.g., textual annunciation) can also be produced on HNAV display 34' within color coded text box 72 to further call a viewer's attention to the potential future risk of an overpressure event, absent the performance of countermeasures or preemptive actions on behalf of one or both of the A/C represented by A/C icons 62, 64.

In certain embodiments, avionic display system 10 may further usefully present suggested preemptive actions or navigational solutions on HNAV display 34', when appropriate. Such navigational solutions may convey recommended courses of action, which can be performed by an A/C to preclude the possible occurrence of the overpressure event whether through speed changes, altitude increases, or rerouting. Further, when multiple A/C are predicted to contribute to the potential occurrence of an overpressure event due to constructive interference, text annunciations may also identify the A/C (single or plural) for which the preemptive actions or navigational solutions are intended. When avionic display system 10 is utilized to direct or manage sonic air traffic, appropriate ATC personnel can then contact the corresponding A/C and convey the suggested navigational solutions. For example, as indicated in the upper left corner of FIG. 3, such navigational solutions may be presented as textual annunciations or messages appearing in a text box 74. The message within text box 74 may, for example, suggest that the A/C represented by icon 60 and/or the A/C represented by icon 64 alter certain flight parameters (e.g., decelerate, climb, or change course) ahead of the projected pressure wave collision to preclude the possible occurrence of constructive interference triggering an overpressure event. Further, the performance of such preemptive actions may lessen the severity of the overpressure event even if such actions are insufficient to preclude the overpressure event. Finally, as indicated in the upper right corner of FIG. 3, avionic display system 10 may also provide the option (here, in the form of a widget or virtual button 76 selectable with a cursor or by touch input 78) of suppressing display of all A/C traveling at non-sonic speeds within the depicted airspace to declutter HNAV display 34', as desired.

Figure 4:
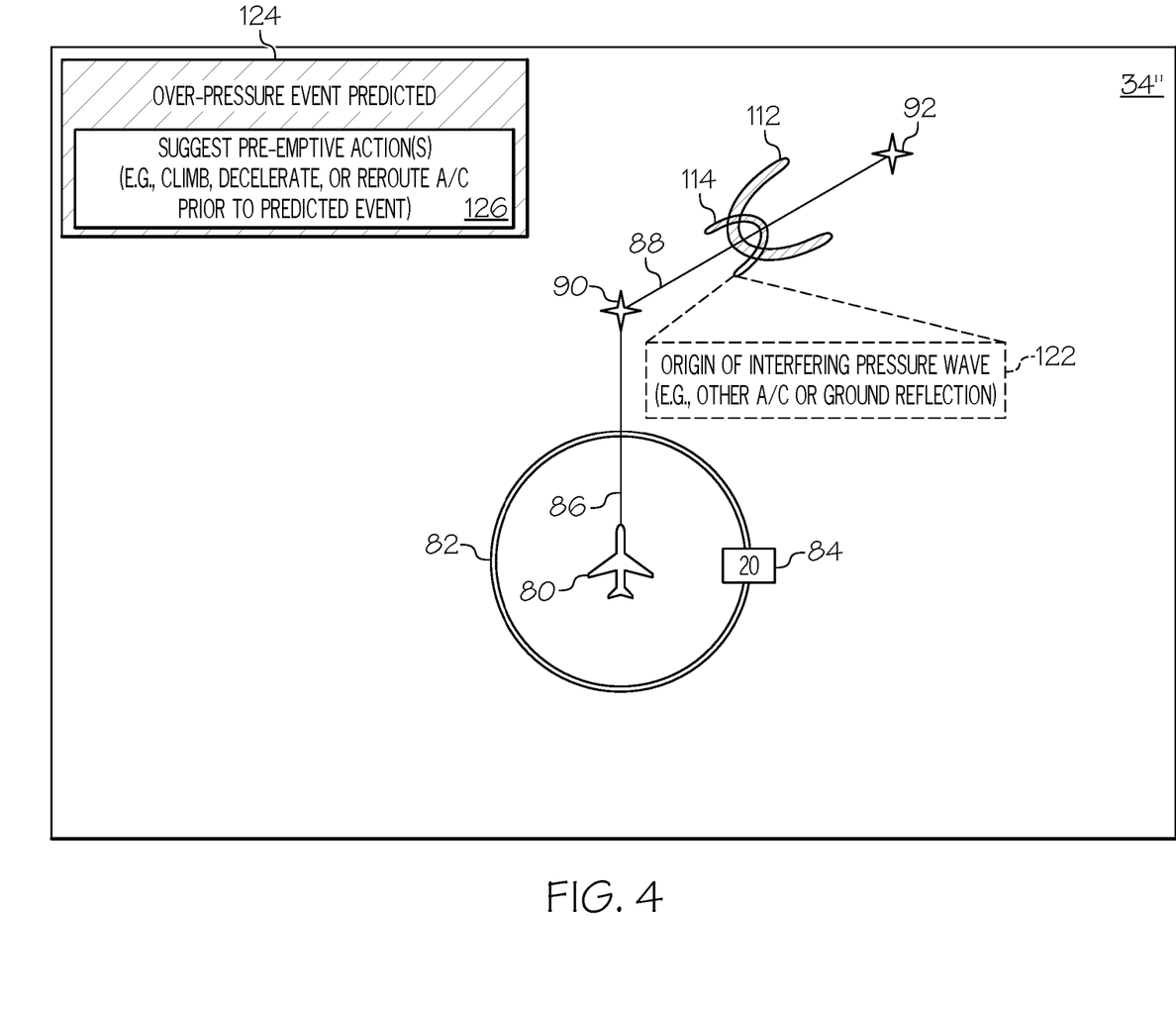
FIGS. 4 and 5 are screenshots of exemplary HNAV and VNAV displays, respectively, which can be generated by the avionic display system shown in FIG. 1 and which each include symbology indicative of the potential occurrence of an overpressure event due to constructive interference between pressure waves, as illustrated in a second flight scenario.
Figure 5:
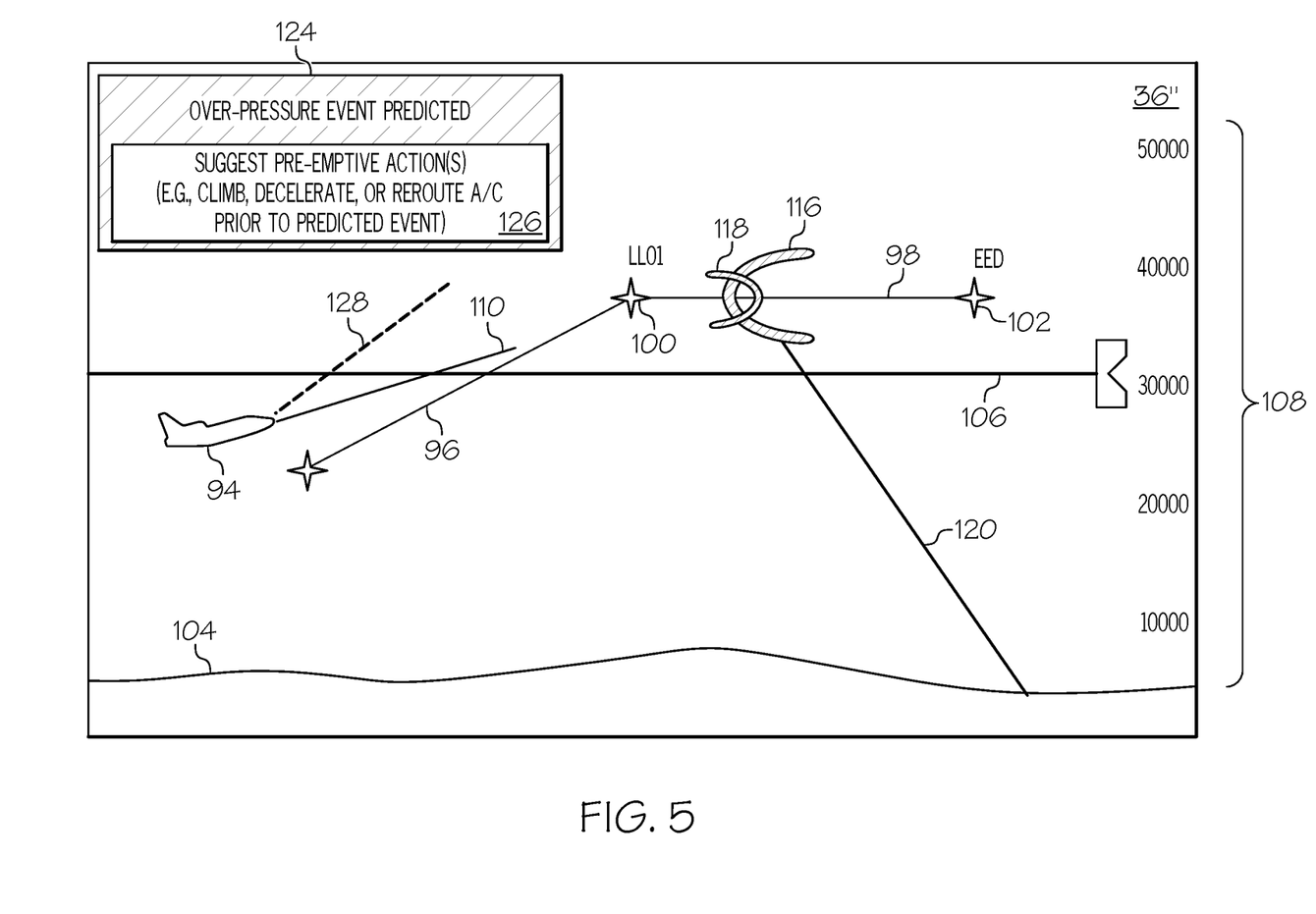

Referring lastly to FIGS. 4 and 5, screenshots of an exemplary HNAV display 34" and a VNAV displays 36" are presented, which may be generated by avionic display system 10 (FIG. 1) during STEP 52 of method 40 (FIG. 2) in a second flight scenario. With initial reference to HNAV display 34" shown in FIG. 4, an A/C icon 80 is surrounded by a range ring 82. As indicated above, A/C icon 80 represents the current horizontal position (latitude and longitude) of an A/C within the field of view of HNAV display 34"; e.g., the ownship A/C when avionic display system 10 is utilized for piloting purposes. A range ring 82 is provided to establish a sense of scale, with readout 84 denoting the radius of ring 82 in nautical miles. A horizontal multi-leg flight route graphic 86, 88 is further generated on HNAV display 34" and includes a number of legs represented by connected line segments 86, 88. As can be seen, line segment 86 extends generally from the nose of A/C icon 80 to a first unlabeled waypoint 90, while line segment 88 extends from waypoint 90 to a second unlabeled waypoint 92. Similarly, VNAV display 36 includes an ownship A/C icon 94 and a vertical multi-leg flight route graphic 96, 98. Vertical flight route 96, 98 graphic includes at least two legs, which are represented by connected line segments 96, 98 extending between labeled waypoints 100, 102. VNAV display 36 can be generated to include various other known graphics or visual elements including, for example, terrain graphics 104, a flight level indicator 106, an AGL tape or scale 108, and a computed flight path indicator 110.

In the flight scenario of FIGS. 4-5, avionic display system 10 has determined that an overpressure event may occur during supersonic flight of the A/C represented by A/C icon 94, as projected into a future timeframe. Accordingly, avionic display system 10 generates symbology on one or both of displays 34", 36" indicative of the forecasted possibility of an overpressure event. Specifically, a number of sonic boom symbols 112, 114, 116, 118 are generated on HNAV display 34" and VNAV display 36" in the illustrated example. Sonic boom symbol 112 is positioned along horizontal flight route graphic 86, 88 on HNAV display 34" at a location generally corresponding to the anticipated horizontal location of the possible overpressure event. Sonic boom symbol 114 is overlaid onto sonic boom symbol 112 to indicate that the pressure waves associated with symbols 112, 114 may collide and, therefore, present the opportunity for constructive interference. The size and rotational orientation of symbols 112, 114 indicating that the pressure wave represented by symbol 112 is predicted to be generated by the A/C represented by icon 80, while the pressure wave corresponding to symbol 114 is predicted to be generated by another non-illustrated A/C (or perhaps also generated by the A/C represented by icon 80 and returned by ground reflection). Similarly, as can be seen in FIG. 5, a first sonic boom symbol 116 and a second intersecting sonic boom symbol 118 are positioned along vertical flight route graphic 96, 98 on VNAV display 36" at a location corresponding to the projected locations at which the pressure waves may collide and potentially trigger an overpressure event should constructive interference occur.

As was with sonic boom 64, 66 shown in FIG. 3, sonic boom symbols 112, 114, 116, 118 are generated as graphics or icons having generally parabolic shapes reminiscent of a wave front seen in two dimensions. Further, as was previously the case, sonic boom symbols 64, 66 may be generated be visually coded to indicate the predicted likelihood and/or maximum possible severity of the potential overpressure event; e.g., color coding can be employed, as indicated in FIGS. 4-5 by crosshatching. If desired, additional overpressure event symbology may also be generated, which conveys other relevant information to a pilot, ATC personnel member, or other viewer of displays 34", 36". For example, as shown in FIG. 5, a symbol 120 may be generated to indicate one or more projected ground strike locations associated with the predicted overpressure event. Symbol 120 is generated as a line segment extending from intersecting sonic boom symbols 116, 118 to the predicted ground strike location; that is, the geographical location at which a combined pressure wave resulting from the pressure wave collision is projected to impact a surface of the Earth (terrain or water). In various embodiments, avionic display system 10 may enable a user to select a particular sonic boom symbol to summon additional information pertaining to the pressure wave corresponding to the symbol, such as a general direction of pressure wave propagation, an estimated amplitude (pressure or decibel level) of the sonic boom at the point of collision, and other such parameters. For example, as indicated in FIG. 4, selection of sonic boom symbol 114 (e.g., utilizing a graphical user interface included in interface 18) may summon a window or textbox 122 indicating the origin of the pressure wave thereby encouraging a viewer of displays 34", 36" to better evaluate potential solutions to the upcoming overpressure event risk.

Advisory messages may be selectively produced on HNAV display 34" and/or VNAV display 36" to further warn of the future possibility or risk of an overpressure event. An example of such an advisory message is shown in textbox 124, which may also be color coded to a warning or alert color (e.g., amber or red) as indicated in FIGS. 4-5 by cross-hatching. Accompanying audible messages or haptic alerts can also be generated. As previously noted, suggested preemptive actions or navigational solutions may also be presented on HNAV display 34" and/or VNAV display 36" when a potential overpressure event is forecast to occur. For example, as further indicated in FIGS. 4-5, a text annunciation 126 can be generated on displays 34", 36" presenting suggested navigational solutions to avert or preclude the potential overpressure event; e.g., by decelerating the appropriate A/C to a specified speed (e.g., Mach speed or airspeed) or by climbing to a particular altitude or flight level prior to the potential overpressure event. Finally, in certain implementations, prompts or cues may be generated on HNAV display 34" and/or VNAV display 36" to assist in implementing the suggested preemptive action or navigational solution. For example, as shown in FIG. 4, a trajectory change indicator 128 can be generated on VNAV display 36" indicating that the A/C represented to icon 94 is recommended to increase AGL altitude ahead of the forecast potential for an overpressure event due to constructive interference between pressure waves. In other embodiments, the visual cues or prompts may assume other forms, such as device deployment cues generated along horizontal flight route graphic 86, 88 and/or vertical flight route graphic 96, 98 indicating the suggested timing of the deployment of a drag device, such as a particular flap, slat, or airbrake.

CONCLUSION

The foregoing has thus provided avionic display systems and methods utilized in the generation of avionic displays including symbology relating the potential occurrence of overpressure events, as well as graphical elements aiding to the avoidance of such overpressure evens. Various embodiments of the avionic display system may forecasting sonic pressure waves generated by supersonic flight of at least one A/C and then provide a visual indication on a avionic display when determining that a predetermined pressure threshold may be exceeded due to constructive interference between the forecast sonic pressure waves. Such a visual indication can include symbology identifying one or more regions of a depicted airspace in which the opportunity for constructive interference between sonic pressure waves arises and/or visual indications of the maximum possible severity (e.g., amplitude) of a combined pressure wave produced by constructive interference of two (or more) colliding pressure waves. The display device can be located onboard an AC and referenced by a pilot; or the display device can be utilized for air traffic control and located within, for example, a ground-based ATC facility. The regions of potential constructive interference may occur due to pressure waves generated a single A/C, which are reflected off terrain and interact with other pressure waves generated by the same A/C. Alternatively, constructive interference may occur due to interactions between pressure waves generated by multiple A/C traveling in the same general airspace.

Such avionic display systems and methods can be utilized in piloting A/C, both manned and unmanned, to reduce the likelihood of overpressure events occurring during supersonic flight of civilian A/C, such as during supersonic over-land flight of passenger jets and commercial airliners. Additionally, the avionic display systems and methods described herein can also be usefully employed in directing supersonic air traffic. Embodiments of the avionic display system may be utilized in the context of traffic control as multiple A/C traveling converge on an airport or airfield. In this case, the avionic display system may compile and repeatedly updating a forecast pressure wave map for air traffic (specifically, those A/C traveling at supersonic Mach speeds) traveling to and departing from a particular airport. Through the implementation of such systems and methods, noise levels and pressure wave intensities of sonic pressure waves can be more effectively limited during supersonic flight of A/C. Finally, as emphasized above, the above-described symbology can be generated on any number and type of avionic displays including vertical navigation and horizontal navigation displays of the type described above, exocentric 3D displays (e.g., displays depicting the 3D flight environment of an A/C from a point external to the A/C), PFDs, and other types of 2D and 3D avionic displays.

Terms such as "comprise," "include," "have," and variations thereof are utilized herein to denote non-exclusive inclusions. Such terms may thus be utilized in describing processes, articles, apparatuses, and the like that include one or more named steps or elements, but may further include additional unnamed steps or elements. While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. An avionic display system, comprising:
    a display device on which an avionic display is generated; and
    a controller architecture operably coupled to the display device, the controller architecture configured to:
        determine when there exists a possibility for an overpressure event to occur in a future timeframe due to a constructive interference between pressure waves forecast to occur during supersonic aircraft flight; and
        when determining that there exists a possibility for an overpressure event to occur in the future timeframe due to the constructive interference between pressure waves, provide a visual indication of a potential occurrence of the overpressure event on the avionic display.

2. The avionic display system of claim 1 wherein the controller architecture is configured to determine when there exists a possibility for the overpressure event to occur in the future timeframe due to the constructive interference between pressure waves by:
    monitoring for predicted collisions between the pressure waves forecast to occur during supersonic aircraft;
    when the pressure waves are predicted to collide, estimating a maximum combined amplitude potentially resulting from the constructive interference between the colliding pressure waves; and
    determining that there exists a possibility for the overpressure event to occur in the future timeframe due to the constructive interference between the colliding pressure waves when the maximum combined amplitude exceeds a boom tolerance threshold.

3. The avionic display system of claim 2 wherein the controller architecture is further configured to:
    assign a value to the boom tolerance threshold based, at least in part, on a time of day at which the pressure waves are predicted to collide.

4. The avionic display system of claim 2 wherein the controller architecture is further configured to:
    assign a value to the boom tolerance threshold based, at least in part, on a geographical location which the pressure waves are predicted to collide.

5. The avionic display system of claim 2 wherein the controller architecture is further configured to:
    assign a value to the boom tolerance threshold based, at least in part, on a geographical location at which a combined pressure wave resulting from the pressure wave collision is projected to impact a surface of the Earth.

6. The avionic display system of claim 2 wherein the controller architecture is further configured to:
    generate the visual indication to comprise symbology indicative of the potential occurrence of the overpressure event; and
    visually code the symbology based, at least in part, upon a disparity between the maximum combined amplitude and the boom tolerance threshold.

7. The avionic display system of claim 1 wherein the controller architecture is further configured to:
    generate the visual indication to comprise symbology identifying a geographical location at which the constructive interference is forecast to occur.

8. The avionic display system of claim 1 wherein the controller architecture is further configured to:
    generate the visual indication to comprise symbology identifying a geographical location at which a combined pressure wave resulting from the pressure wave collision is projected to impact a surface of the Earth.

9. The avionic display system of claim 1 further comprising a datalink operably coupled to the controller architecture, the controller architecture further configured to:
    obtain sonic boom predictions from a remote source in wireless communication with the avionic display system via the datalink; and
    utilize the sonic boom predictions in determining when there exists a possibility for the overpressure event to occur in the future timeframe due to the constructive interference between the pressure waves forecast to occur during supersonic aircraft flight.

10. The avionic display system of claim 9 wherein the controller architecture is configured to obtain sonic boom predictions by:
    calculating future flight parameters for one or more aircraft; and
    providing the future flight parameters to the remote source for usage in generating the sonic boom predictions.

11. The avionic display system of claim 1 wherein the controller architecture is further configured to:
    generate the visual indication to comprise graphics identifying the aircraft predicted to generate the sonic pressure waves subject to a potential constructive interference.

12. The avionic display system of claim 1 wherein the controller architecture is further configured to:
    when determining that there exists a possibility for the overpressure event to occur in the future timeframe due to the constructive interference between the pressure waves generated by at least a first aircraft, identify a preemptive action that can be performed by the first aircraft to avert the potential occurrence of the overpressure event; and present the preemptive action on the avionic display.

13. An avionic display system, comprising:

a display device on which an avionic display is generated;

a controller architecture operably coupled to the display device; and storage media containing a computer-executable code that, when executed by the controller architecture, causes the avionic display system to perform the operations of:

forecasting whether a constructive interference may occur between sonic pressures waves generated by aircraft traveling through an airspace;

when forecasting that the constructive interference may occur, calculating a maximum combined amplitude potentially resulting from the constructive interference; and generating an overpressure event symbology on the avionic display when the maximum combined amplitude exceeds a predetermined boom tolerance threshold.

14. The avionic display system of claim 13 wherein the computer-executable code, when executed by the controller architecture, further causes the avionic display system to:

assign a value to the boom tolerance threshold based, at least in part, on a geographical location at which the constructive interference may occur between the sonic pressure waves.

15. The avionic display system of claim 13 wherein the computer-executable code, when executed by the controller architecture, further causes the avionic display system to:

obtain data containing sonic boom predictions from a remote source in communication with the avionic display system; and utilize the data in forecast whether the overpressure event may occur as a result of the constructive interference between sonic pressures waves.

16. The avionic display system of claim 13 wherein the computer-executable code, when executed by the controller architecture, further causes the avionic display system to:

produce the avionic display as a horizontal navigation display; and generate the overpressure event symbology to identify a location on the horizontal navigation display geographical location at which the constructive interference may occur and to the aircraft predicted to generate the sonic pressure waves potentially subject to the constructive interference.

17. The avionic display system of claim 13 wherein the computer-executable code, when executed by the controller architecture, further causes the avionic display system to:

construct a pressure wave forecast map based upon a projected supersonic flight of at least one aircraft;

search the pressure wave forecast map for regions in which the constructive interference may occur between sonic pressures waves; and when identifying a region of pressure wave forecast map in which the constructive interference may occur between sonic pressures waves, calculating the maximum combined amplitude potentially resulting from the constructive interference.

18. A method carried-out by an avionic display system including a display device and a controller architecture operably coupled to the display device, the method comprising:

forecasting whether there exists a possibility for an overpressure event to occur as a result of a constructive interference between pressures waves generated during supersonic flight of one or more aircraft, as projected into a future timeframe; and when forecasting that there exists a possibility for an overpressure event to occur, generating a visual indication on the display device of a potential future occurrence of the overpressure event.

19. The method of claim 18 wherein forecasting comprises:

estimating a maximum combined amplitude potentially resulting from the constructive interference between the pressure waves generated during supersonic aircraft flight; and determining that there exists a possibility for an overpressure event to occur due to the constructive interference between the pressure waves when the maximum combined amplitude exceeds a boom tolerance threshold.

20. The method of claim 18 further comprising:

constructing a pressure wave forecast map utilizing sonic boom forecast data obtained from a remote a source in wireless communication with the avionic display system; and searching the pressure wave forecast map for regions in which the overpressure event may occur due to a potential constructive interference between colliding pressures waves.

* * * * *